(12) United States Patent
Sanchez

(10) Patent No.: US 6,639,873 B1
(45) Date of Patent: Oct. 28, 2003

(54) MARINE SEISMIC SOURCE

(75) Inventor: John Albert Sanchez, Bergen (NO)

(73) Assignee: WesternGeco LLC, Houston, TX (US)

( * ) Notice: Subject to any disclaimer, the term of this patent is extended or adjusted under 35 U.S.C. 154(b) by 0 days.

(21) Appl. No.: 10/129,994

(22) PCT Filed: Nov. 9, 2000

(86) PCT No.: PCT/IB00/01638

§ 371 (c)(1),
(2), (4) Date: Aug. 13, 2002

(87) PCT Pub. No.: WO01/37001

PCT Pub. Date: May 25, 2001

(30) Foreign Application Priority Data

Nov. 17, 1999 (GB) .............................. 9927052

(51) Int. Cl.$^7$ ................................. G01V 1/20
(52) U.S. Cl. ........................ 367/144; 181/120
(58) Field of Search .................... 367/144; 181/113, 181/115, 120

(56) References Cited

U.S. PATENT DOCUMENTS

| | | | | |
|---|---|---|---|---|
| 4,715,023 A | * | 12/1987 | Otto | 367/144 |
| 5,432,757 A | * | 7/1995 | Chelminski | 367/144 |
| 5,475,188 A | * | 12/1995 | Cappelen et al. | 181/120 |

* cited by examiner

*Primary Examiner*—Ian J. Lobo
(74) *Attorney, Agent, or Firm*—David S. Figatner; Streets & Steele

(57) ABSTRACT

A marine seismic source consists of one or more airguns (1) suspended from a float (2). A supply harness (5) is provided to supply compressed air and electrical control signals to the airguns. The airgun is mounted such that the harness (5) is below the point at which air is emitting from the airgun (1). This means that bubbles of air that rise from the airgun when it is fired do not impact on the harness and so cannot damage the harness.

15 Claims, 3 Drawing Sheets

MARINE SEISMIC SOURCE

BACKGROUND OF THE INVENTION

1. Field of the Invention

The present invention relates to a marine seismic source. In particular, it relates to a marine seismic source that consists of one or more airguns suspended from a float.

2. Description of the Related Art

A conventional marine seismic source of this type is disclosed in U.S. Pat. No. 4,686,660, and is shown schematically in FIG. 1.

The marine seismic source of FIG. 1 is intended to be towed behind a survey vessel. The source comprises a number of airguns 1 that are suspended from a float 2. The seismic source shown in FIG. 1 is intended to be towed to the left, and the left hand end 3 of the float is shaped so as to reduce water resistance when the source is towed in this direction. A tow line 4 to a towing vessel (not shown) is attached to the seismic source at the point A.

In the seismic source of FIG. 1 the airguns 1 are suspended from a supply harness 5. The airguns can be suspended singly or in a cluster of two or more airguns.

An airgun consists essentially of a container, normally a cylinder, that is charged with air at a high pressure such as several thousand p.s.i. In order to fire an airgun, a port in the airgun is opened by a solenoid-operated valve, thereby releasing the high-pressure air contained within the airgun. The released air forms a rapidly expanding bubble, so creating a powerful pressure wave. Information about the geological formations under the seabed can be deduced from the reflections of the pressure wave.

In the source of FIG. 1, the supply harness 5 consists of a plurality of electronic or electrical control boxes 7, each of which may be substantially as described in U.S. Pat. No. 4,757,482. The boxes 7 are linked by horizontal chains 8. One control box 7 is provided for each airgun or each cluster of airguns, and an airgun or cluster of airguns is suspended from its associated control box 7 by support chains 10 or other suitable support means. The control boxes 7 are linked by the horizontal chains 8, and the chains 8 bear at least part of the towing load when the source is under tow.

The supply harness is also provided with an air hose and electrical cables (not shown in FIG. 1). The air hose supplies air to the airguns from a source of compressed air on the towing vessel. The electrical cables supply electrical firing signals from an operator on the towing vessel to the solenoid-operated valve on each of the airguns, and return control and data signals from the airguns to the operator. The control boxes contain electronic or electrical circuits for processing the firing signals and actuating the solenoid-operated valve on the airgun or airgun cluster to fire the airgun(s), and also process control and data signals returned from the airgun(s) and forward them to the operator on the towing vessel. Thus, the supply harness 5 combines the two functions of, firstly, supplying the airguns with compressed air and electrical signals and, secondly, supporting the airguns and transmitting at least some of the towing load.

The harness 5 is suspended from the float 2 by chains 6 or other suitable supporting members. The towing point A is linked to the front control box by a further horizontal chain 8', and is also supported by an inclined chain 9 from the front end of the float 3. In the array shown in FIG. 1, the chains 6 from the float 2 are attached to the control boxes 7, and the airgun or airgun cluster associated with each control box is suspended from the control box by further chains 10.

In alternative prior art marine seismic sources, individual control boxes are not provided for each airgun or cluster of airguns. Instead the control circuits are provided either in a single control box at the leading end of the harness, or on the towing vessel. In these sources, the harness 5 would consist of the horizontal chains 8, the air hose, and the electrical cables. The harness would be suspended from the float, with the support chains 6 attached directly to the horizontal chains. The airguns would be suspended from the harness.

Marine seismic sources of the general type shown in FIG. 1 have the disadvantage that the airguns 1 are mounted below the harness 5. Air is released violently from the airguns when they are fired, over a period of typically a few milliseconds. The released air initially forms expanding bubbles, and these rise to the sea surface. The volume of the bubbles oscillates as the bubble rises. Since the airguns are mounted below the harness, the air bubbles will impact the harness as they rise. As airguns become more powerful there is an increasing tendency for the violence of the expansion of the bubbles to damage the harness.

BRIEF SUMMARY OF THE INVENTION

The present invention comprises a marine seismic source comprising: a float; an airgun; and a supply harness; wherein, in use, the airgun is suspended from the float such that its point of emission of air is at a shallower depth than the supply harness.

Since the airgun is suspended such that the point at which air bubbles are emitted is at a shallower depth than the supply harness, the impact on the harness of rising air bubbles produced when the airguns are fired is lessened. The risk of damage to the harness is therefore reduced.

BRIEF DESCRIPTION OF THE DRAWINGS

Preferred features of the invention are set out in the dependent claims.

Preferred features of the invention will now be described by way of illustrative example with reference to the accompanying drawings, in which.

Like reference numerals denote like components throughout the drawings.

DETAILED DESCRIPTION OF THE INVENTION

Figure 1:
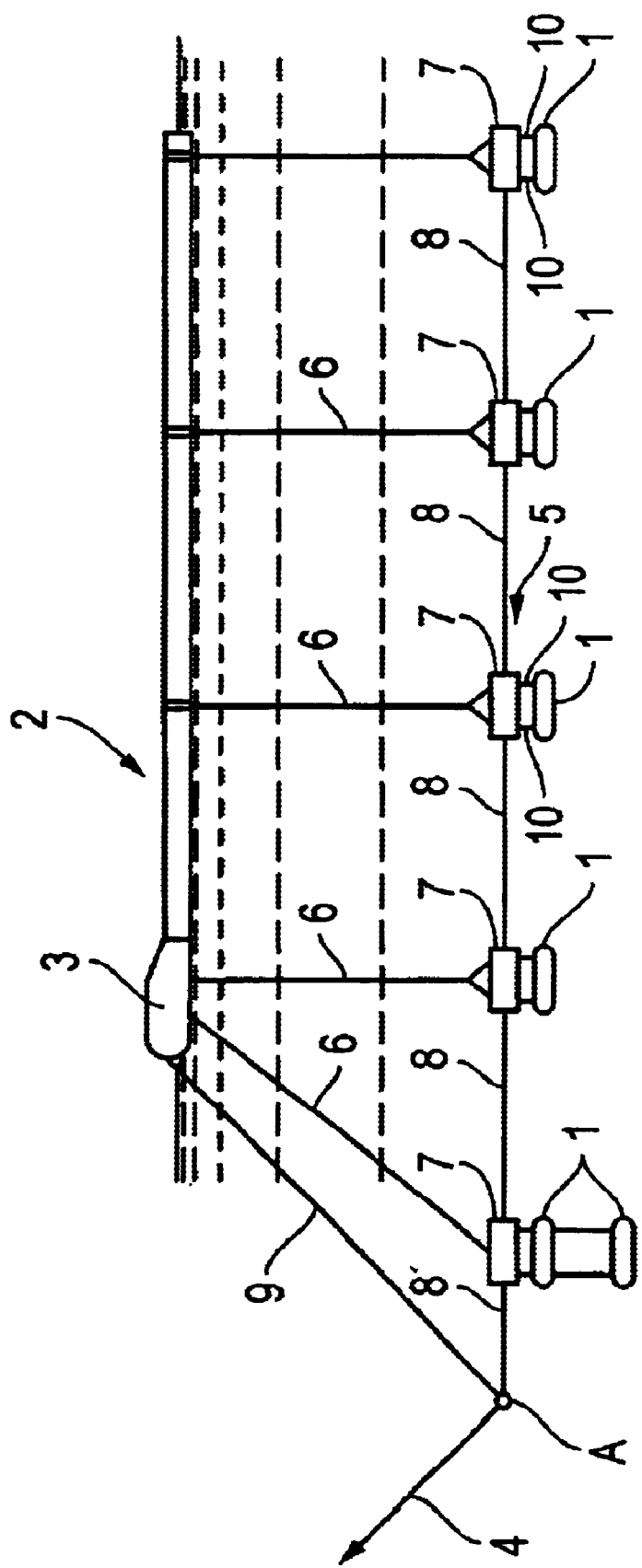
FIG. 1 is a schematic illustration of a prior art marine seismic source.
Figure 2:
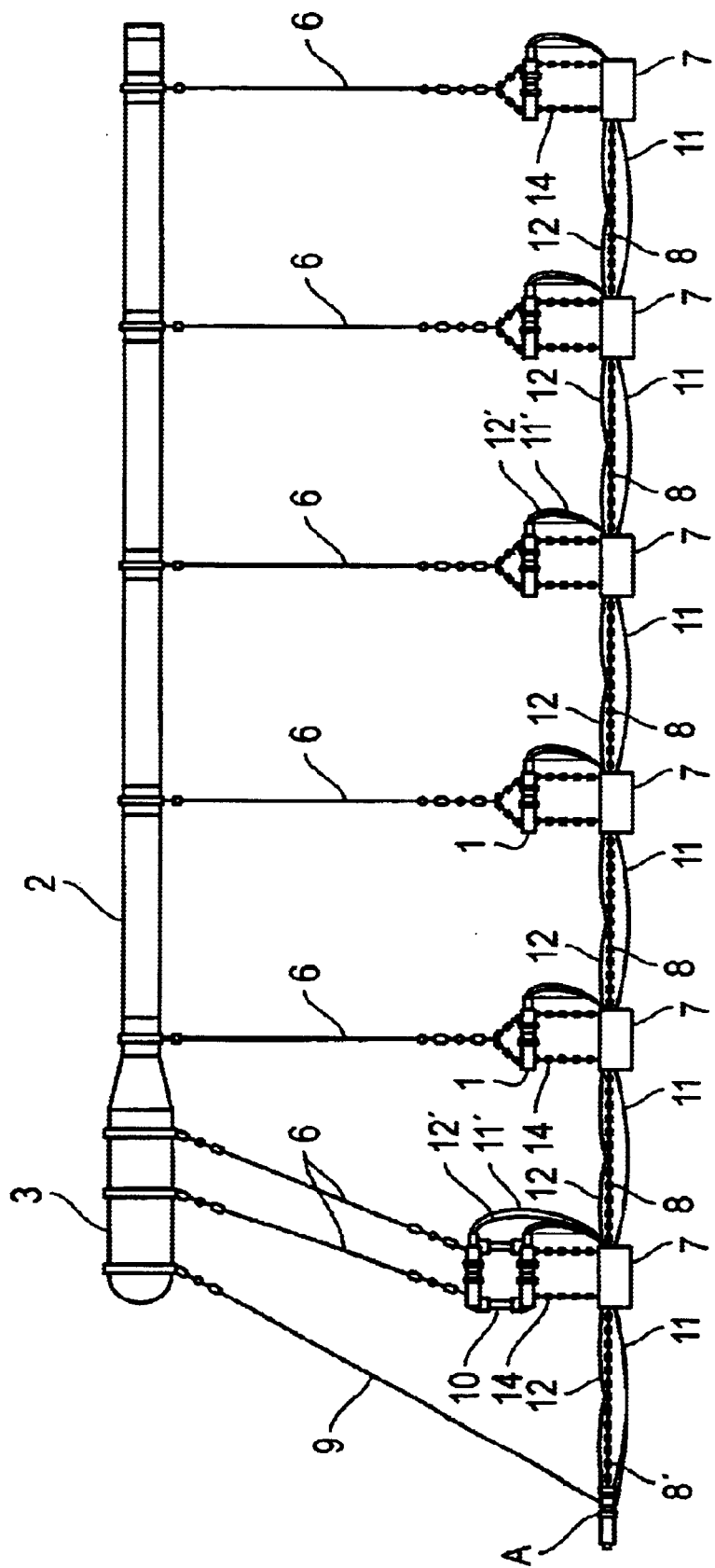
FIG. 2 is a schematic illustration of a marine seismic source according to an embodiment of the present invention.

FIG. 2 shows a marine seismic source according to an embodiment of the present invention. As with the prior art source of FIG. 1, the source shown in FIG. 2 comprises a plurality of airguns 1 suspended from a float 2. In the embodiment of FIG. 2 the float 2 is an elongate float of the type described in U.S. Pat. No. 4,686,660 and the end 3 of the float that is intended to be the leading end when the source is towed is shaped so as to reduce water resistance. The invention is not limited to this particular float however and, in principle, any float that provides sufficient buoyancy to support the airguns and supply harness can be used.

The marine seismic source of FIG. 2 comprises a plurality of airguns 1. These can be arranged either singularly or in clusters of two or more airguns. Each airgun or cluster of airguns is provided with an associated electrical or electronic control box 7. In the source shown in FIG. 2 there are five single airguns and one cluster of two airguns, and six control boxes, but the invention is not limited to a source having this precise number and arrangement of airguns.

The control boxes 7 are interconnected by a harness 5. The harness includes horizontal chains 8 or other suitable members that connect adjacent control boxes. A further chain 8' connects the towing point A to the nearest of the control boxes, and an inclined support chain 9 connects the tow point A to the front end of the head member 3 of the float. The chains 8, 8' carry at least part of the towing load when the source is towed.

The harness is also provided with an air hose 11 and an electrical cable 12. The air hose supplies the airguns with air from a source of compressed air on board the towing vessel, and is preferably an armoured air hose for durability. The air hose 11 extends to all the control boxes 7 in the supply harness, and branch air hoses 11 t connect the supply harness with each of the airguns 1 so as to supply compressed air to each of the airguns.

The electrical cable 12 also extends to each of the control boxes 7 in the harness, and separate cables 12' connect the supply harness with each of the airguns. The cables 12,12' transmit electrical firing signals from an operator on the towing vessel to the airguns, so that the operator can fire a particular airgun. The control boxes 7 contain electronic or electrical circuits for processing firing signals received from the operator and firing the airgun when instructed. Control and data signals, for example confirming that an airgun has been successfully fired, are also returned to the operator via the electrical cables 12,12'.

In the seismic source of FIG. 2, the airguns 1 are not disposed at a greater depth than the supply harness 5. Instead, the airguns 1 are suspended from the float 2 at a shallower depth than the harness 5. Accordingly, when a bubble of air created on firing an airgun rises to the sea surface its impact on the harness is reduced, and the possibility that the rising bubble of air can damage the harness is thus reduced.

In the embodiment of FIG. 2, having the airguns at a shallower depth than the supply harness is achieved essentially by suspending the harness 5 from the airguns. As can be seen in FIG. 2, the airguns 1 are directly suspended from the float 2 by means of support chains 6 or other suitable support members. In the case of an airgun cluster, the uppermost airgun in the cluster is suspended from the float, and the other airgun(s) in the cluster is/are connected to the uppermost airgun by support members 10. The support members are preferably rigid, so that the spacing between the airguns of the cluster is constant.

In the seismic source shown in FIG. 2, the control box 7 associated with a single airgun 1 is suspended directly from the airgun by support chains 14 or other suitable support members. In the case of a cluster of airguns, the control box 7 is suspended from the lowermost airgun in the cluster.

In the embodiment of FIG. 2 the leading airgun cluster is connected to the float 2 by two separate support chains. The remaining airguns are connected to the float by single support chains 6, and these single support chains are bifurcated at their lower end to enable the airguns to be mounted substantially horizontally. The invention is not limited to this particular mounting arrangement however, and any suitable mounting arrangement can be used. For example, each airgun could be supported by two or more support chains.

Air is released from the airguns violently (typically in a few milliseconds), and initially forms an expanding bubble with a volume that oscillates as the bubble rises. It is therefore preferable for the harness to be a significant distance below the airguns to mini mise the impact of the bubbles on the harness, and in the embodiment shown in FIG. 2 the airguns 1 are suspended above the harness such that the lowest point of each airgun is well above and completely clear of the harness 8. In principle, however, it is not necessary for the airguns 1 to be mounted that much above the harness 5, since some benefit of the present invention will be obtained provided that the point of emission of air from the airgun 1 is at a shallower depth than the harness.

In the embodiment shown in FIG. 2 the airguns 1 are suspended from the float 2, and the control box 7 associated with an airgun or cluster of airguns is suspended from the airgun or cluster of airguns. In principle, however, it would be possible to suspend the both airguns and the control boxes directly from the float 2, with the control boxes being suspended at a greater depth than the airguns.

Figure 3:
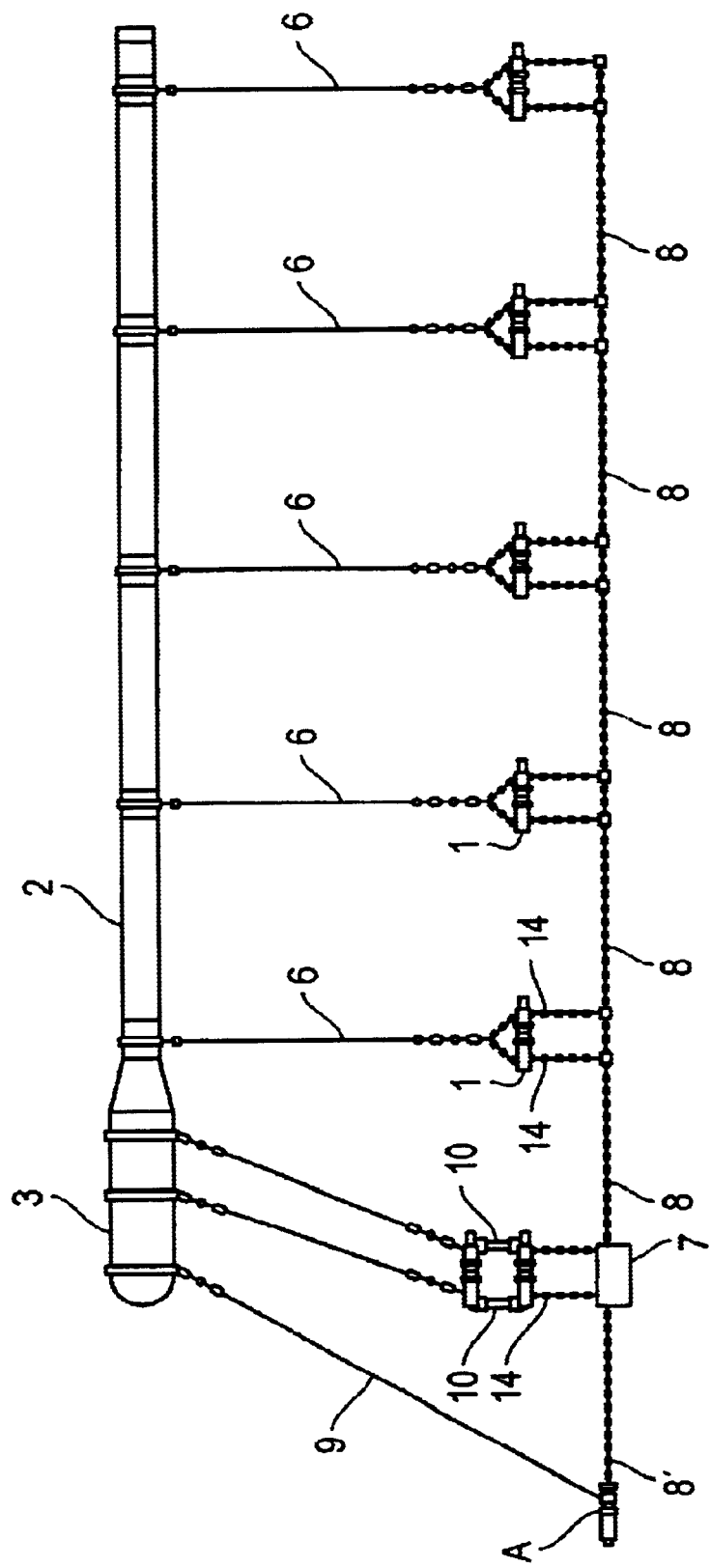
FIG. 3 is a schematic illustration of a marine seismic source according to another embodiment of the present invention.

It should understood that the present invention may be embodied in other ways than shown in FIG. 2. For example, FIG. 3 shows the invention applied to a seismic source in which only a single control box, for controlling all the airguns, is provided on the harness. The control box is suspended from one of the airguns, more specifically from the leading airgun cluster in FIG. 3.

The present invention can also be applied to a source in which the control box is not mounted on the source but is mounted on the tow vessel.

What is claimed is:

1. A marine seismic source comprising; a float; an airgun; and a supply harness for supplying air to the airgun;
   wherein, in use, the airgun is suspended from the float at a shallower depth than the supply harness.

2. A marine seismic source as claimed in claim 1, wherein, in use, the airgun is suspended from the float and the supply harness is suspended from the airgun.

3. A marine seismic source as claimed in claim 2, wherein the supply harness further comprises a control box associated with the airgun, and wherein, in use, the airgun is suspended from the float and the control box is suspended from the airgun.

4. A marine seismic source as claimed in claim 1, comprising a plurality of airguns, wherein, in use, each airgun is suspended from the float at a shallower depth than the supply harness.

5. A marine seismic source, comprising:
   an airgun having a discharge port for releasing pressurized air;
   a supply harness for delivering pressurized air to the airgun; and
   a floatation assembly for supporting the airgun such that its discharge port lies at a first depth and supporting the supply harness at a second depth in a mane environment, the second depth being greater than the first depth, whereby the effect of pressurized air released from the discharge port of the airgun on the supply harness is reduced.

6. The marine seismic source of claim 5, comprising a plurality of airguns, and wherein the flotation assembly supports the plurality of airguns such that the discharge port of each of the airguns lies substantially at the first depth.

7. The marine seismic source of claim 5, wherein the flotation assembly includes a support chain supporting the airgun.

8. The marine seismic source of claim 5, wherein the flotation assembly includes a plurality of support chains supporting the supply harness.

9. The marine seismic source of claim 5, wherein the airgun has a cylindrical body and is suspended such that the axis of its body lies substantially at the first depth.

10. The marine seismic source of claim 5, wherein the supply harness is elongated and defines a substantially linear axis, and the supply harness is suspended such that its axis lies substantially at the second depth.

11. A method of producing a seismic source event in a marine environment, comprising the steps of:

suspending an airgun such that it releases air at a first depth in the marine environment when actuated;

suspending a supply harness at a second depth in the marine environment beneath the first depth;

delivering a volume of pressurized air to the airgun via the supply harness; and actuating the airgun to release at least a portion of the pressurized air volume from the airgun into the marine environment at the first depth.

12. A method of producing a plurality of seismic source events in a marine environment, comprising the steps of:

suspending a plurality of airguns in the marine environment such that each of the airguns releases air substantially at the first depth when actuated;

suspending a supply harness at a second depth beneath the first depth in the marine environment;

delivering a volume of pressurized air to the airguns via the supply harness; and releasing at least a portion of the pressurized air volume from the airguns into the marine environment substantially at the first depth.

13. The method of claim 11, wherein the airgun and supply harness are suspended by a flotation assembly.

14. The method of claim 11, wherein the airgun has a cylindrical body, and is suspended such that the axis of its body lies substantially at the first depth.

15. The method of claim 11, wherein the supply harness is elongated and defines a substantially linear axis, and the supply harness is suspended such that its axis lies substantially at the second depth.

\* \* \* \* \*